US009947177B2

(12) United States Patent
Naylor et al.

(10) Patent No.: US 9,947,177 B2
(45) Date of Patent: *Apr. 17, 2018

(54) CONDUCTING A SIDE BET IN A GAME

(71) Applicant: IGT, Las Vegas, NV (US)

(72) Inventors: Toby F. Naylor, Belgrade, MT (US); Jerry L. Byrd, Bozeman, MT (US); Shad G. Clingingsmith, Belgrade, MT (US); John E. Thieltges, Bozeman, MT (US); Tyson C. Joehler, Bozeman, MT (US); Kyle A. Larson, Belgrade, MT (US); Tom W. Kleckner, Bozeman, MT (US); Steven K. Lundberg, Bozeman, MT (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,278

(22) Filed: May 2, 2016

(65) Prior Publication Data

US 2016/0247355 A1 Aug. 25, 2016

Related U.S. Application Data

(63) Continuation of application No. 14/013,929, filed on Aug. 29, 2013, now Pat. No. 9,336,650.

(51) Int. Cl.
*A63F 13/00* (2014.01)
*G07F 17/32* (2006.01)

(52) U.S. Cl.
CPC ...... *G07F 17/3244* (2013.01); *G07F 17/3213* (2013.01); *G07F 17/3293* (2013.01); *G07F 17/3227* (2013.01)

(58) Field of Classification Search
None
See application file for complete search history.

(56) References Cited

U.S. PATENT DOCUMENTS

| | | | |
|---|---|---|---|
| 4,669,730 | A | 6/1987 | Small |
| 4,743,002 | A | 5/1988 | Menzel |
| 4,856,787 | A | 8/1989 | Itkis |
| 4,922,522 | A | 5/1990 | Scanlon |
| 5,019,973 | A | 5/1991 | Wilcox et al. |
| 5,178,395 | A | 1/1993 | Lovell |
| 5,248,142 | A | 9/1993 | Breeding |
| 5,288,081 | A | 2/1994 | Breeding |
| 5,393,057 | A | 2/1995 | Marnell, II |
| 5,393,067 | A | 2/1995 | Paulsen et al. |

(Continued)

FOREIGN PATENT DOCUMENTS

| | | |
|---|---|---|
| WO | WO 9609102 | 3/1996 |
| WO | WO 9719736 | 6/1997 |

(Continued)

*Primary Examiner* — Jason Yen
(74) *Attorney, Agent, or Firm* — Neal, Gerber & Eisenberg LLP

(57) ABSTRACT

Systems and methods for conducting a side bet in a game include receiving side bet parameters that control how the side bet is conducted. The side bet parameters may include a specified in-game event. Gameplay of the game by participants of the side bet may be monitored to determine whether the in-game event has occurred for one of the participants. If so, funds associated with the side bet may be apportioned to the winning participant.

20 Claims, 6 Drawing Sheets

(56) References Cited

U.S. PATENT DOCUMENTS

| | | | |
|---|---|---|---|
| 5,415,416 | A | 5/1995 | Scagnelli et al. |
| 5,472,194 | A | 12/1995 | Breeding et al. |
| 5,531,448 | A | 7/1996 | Moody |
| 5,544,892 | A | 8/1996 | Breeding |
| 5,632,485 | A | 5/1997 | Woodland et al. |
| 5,673,917 | A | 10/1997 | Vancura |
| 5,720,662 | A | 2/1998 | Holmes, Jr. et al. |
| 5,732,950 | A | 3/1998 | Moody |
| 5,788,574 | A | 8/1998 | Ornstein et al. |
| 5,823,873 | A | 10/1998 | Moody |
| 5,839,730 | A | 11/1998 | Pike |
| 5,848,932 | A | 12/1998 | Adams |
| 5,851,148 | A | 12/1998 | Brune et al. |
| 5,890,962 | A | 4/1999 | Takemoto |
| 5,967,896 | A | 10/1999 | Jorasch et al. |
| 6,019,374 | A | 2/2000 | Breeding |
| 6,056,641 | A | 5/2000 | Webb |
| 6,068,552 | A | 5/2000 | Walker et al. |
| 6,079,711 | A | 6/2000 | Wei et al. |
| 6,089,978 | A | 7/2000 | Adams |
| 6,110,041 | A | 8/2000 | Walker et al. |
| 6,120,378 | A | 9/2000 | Moody et al. |
| 6,149,522 | A | 11/2000 | Alcorn et al. |
| 6,159,095 | A | 12/2000 | Frohm et al. |
| 6,179,711 | B1 | 1/2001 | Yoseloff |
| 6,203,428 | B1 | 3/2001 | Giobbi et al. |
| 6,203,429 | B1 | 3/2001 | Demar et al. |
| 6,210,277 | B1 | 4/2001 | Stefan |
| 6,227,969 | B1 | 5/2001 | Yoseloff |
| 6,237,916 | B1 | 5/2001 | Webb |
| 6,254,481 | B1 | 7/2001 | Jaffe |
| 6,264,561 | B1 | 7/2001 | Saffari et al. |
| 6,270,411 | B1 | 8/2001 | Gura et al. |
| 6,290,600 | B1 | 9/2001 | Glasson |
| 6,334,814 | B1 | 1/2002 | Adams |
| 6,336,857 | B1 | 1/2002 | McBride |
| 6,358,146 | B1 | 3/2002 | Adams |
| 6,394,902 | B1 | 5/2002 | Glavich et al. |
| 6,394,907 | B1 | 5/2002 | Rowe |
| 6,398,645 | B1 | 6/2002 | Yoseloff |
| 6,419,579 | B1 | 7/2002 | Bennett |
| 6,425,823 | B1 | 7/2002 | Byrne |
| 6,443,841 | B1 | 9/2002 | Rossides |
| 6,511,068 | B1 | 1/2003 | Sklansky et al. |
| 6,517,073 | B1 | 2/2003 | Vancura |
| 6,520,856 | B1 | 2/2003 | Walker et al. |
| 6,523,829 | B1 | 2/2003 | Walker et al. |
| 6,561,904 | B2 | 5/2003 | Locke et al. |
| 6,607,195 | B2 | 8/2003 | Vancura |
| 6,652,378 | B2 | 11/2003 | Cannon et al. |
| 6,656,040 | B1 | 12/2003 | Brosnan et al. |
| 6,656,044 | B1 | 12/2003 | Lewis |
| 6,663,488 | B1 | 12/2003 | Adams |
| 6,679,497 | B2 | 1/2004 | Walker et al. |
| 6,685,567 | B2 | 2/2004 | Cockerille et al. |
| 6,692,003 | B2 | 2/2004 | Potter et al. |
| 6,695,696 | B1 | 2/2004 | Kaminkow |
| 6,702,289 | B1 | 3/2004 | Feola |
| 6,726,565 | B2 | 4/2004 | Hughs-Baird |
| 6,746,328 | B2 | 6/2004 | Cannon et al. |
| 6,789,801 | B2 | 9/2004 | Snow |
| 6,793,578 | B2 | 9/2004 | Luccesi et al. |
| 6,804,763 | B1 | 10/2004 | Stockdale et al. |
| 6,827,646 | B2 | 12/2004 | Adams |
| 6,863,608 | B1 | 3/2005 | LeMay et al. |
| 6,866,586 | B2 | 3/2005 | Oberberger et al. |
| 7,029,395 | B1 | 4/2006 | Baerlocher |
| 7,111,845 | B2 | 9/2006 | Walker et al. |
| 7,201,654 | B1 | 4/2007 | Jarvis et al. |
| 7,226,358 | B2 | 6/2007 | Miller et al. |
| 7,329,179 | B2 | 2/2008 | Baerlocher |
| 7,351,146 | B2 | 4/2008 | Kaminkow |
| 7,425,177 | B2 | 9/2008 | Rodgers et al. |
| 7,427,236 | B2 | 9/2008 | Kaminkow et al. |
| 7,429,215 | B2 | 9/2008 | Rozkin et al. |
| 7,503,849 | B2 | 3/2009 | Hornik et al. |
| 7,594,851 | B2 | 9/2009 | Falconer |
| 7,837,554 | B2 | 11/2010 | Kaminkow et al. |
| 7,841,939 | B2 | 11/2010 | Baerlocher et al. |
| 7,931,532 | B2 | 4/2011 | Johnson |
| 7,980,948 | B2 | 7/2011 | Rowe et al. |
| 8,192,267 | B2 | 6/2012 | Acres |
| 8,517,824 | B2 | 8/2013 | Zielinski et al. |
| 8,585,492 | B2 | 11/2013 | Barclay et al. |
| 8,628,412 | B2 | 1/2014 | Zielinski et al. |
| 8,747,220 | B2 | 6/2014 | Castle et al. |
| 2002/0045474 | A1 | 4/2002 | Singer et al. |
| 2002/0077170 | A1 | 6/2002 | Johnson et al. |
| 2002/0094869 | A1 | 7/2002 | Harkham |
| 2003/0003989 | A1 | 1/2003 | Johnson |
| 2003/0060268 | A1 | 3/2003 | Falconer |
| 2003/0073497 | A1 | 4/2003 | Nelson |
| 2003/0144053 | A1 | 7/2003 | Michaelson |
| 2003/0203756 | A1 | 10/2003 | Jackson |
| 2004/0002379 | A1 | 1/2004 | Parrott et al. |
| 2004/0063492 | A1 | 4/2004 | Baerlocher et al. |
| 2004/0070146 | A1 | 4/2004 | Snow |
| 2004/0072619 | A1 | 4/2004 | Brosnan et al. |
| 2004/0084843 | A1 | 5/2004 | Snow |
| 2004/0090003 | A1 | 5/2004 | Snow |
| 2004/0090005 | A1 | 5/2004 | Snow |
| 2004/0106446 | A1 | 6/2004 | Cannon et al. |
| 2004/0147314 | A1 | 7/2004 | LeMay et al. |
| 2004/0152509 | A1 | 8/2004 | Hornik et al. |
| 2005/0003886 | A1 | 1/2005 | Englman et al. |
| 2005/0085288 | A1 | 4/2005 | Schugar et al. |
| 2005/0192099 | A1 | 9/2005 | Nguyen et al. |
| 2005/0233803 | A1 | 10/2005 | Yang |
| 2005/0239542 | A1 | 10/2005 | Olsen |
| 2006/0040732 | A1 | 2/2006 | Baerlocher et al. |
| 2006/0073882 | A1 | 4/2006 | Rozkin et al. |
| 2006/0128457 | A1 | 6/2006 | Cannon |
| 2006/0211473 | A1 | 9/2006 | Walker et al. |
| 2006/0247010 | A1 | 11/2006 | Gagner |
| 2006/0247011 | A1 | 11/2006 | Gagner |
| 2006/0247029 | A1 | 11/2006 | Walker et al. |
| 2007/0020604 | A1 | 1/2007 | Chulet |
| 2007/0054726 | A1 | 3/2007 | Muir et al. |
| 2007/0060314 | A1 | 3/2007 | Baerlocher et al. |
| 2007/0060321 | A1 | 3/2007 | Vasquez et al. |
| 2007/0102877 | A1 | 5/2007 | Personius et al. |
| 2007/0155482 | A1 | 7/2007 | Walker et al. |
| 2007/0155483 | A1 | 7/2007 | Walker et al. |
| 2007/0155484 | A1 | 7/2007 | Walker et al. |
| 2007/0167211 | A1 | 7/2007 | Rodgers et al. |
| 2007/0191088 | A1 | 8/2007 | Breckner et al. |
| 2007/0243925 | A1 | 10/2007 | LeMay et al. |
| 2007/0273097 | A1 | 11/2007 | Kirkutis |
| 2007/0293293 | A1 | 12/2007 | Baerlocher et al. |
| 2008/0067745 | A1 | 3/2008 | Wikstrom |
| 2008/0076496 | A1 | 3/2008 | Baerlocher et al. |
| 2008/0076531 | A1 | 3/2008 | Baerlocher et al. |
| 2008/0076532 | A1 | 3/2008 | Graham et al. |
| 2008/0076542 | A1 | 3/2008 | Iddings et al. |
| 2008/0108401 | A1 | 5/2008 | Baerlocher et al. |
| 2008/0108425 | A1 | 5/2008 | Oberberger |
| 2008/0146344 | A1* | 6/2008 | Rowe .................. G07F 17/3288 463/42 |
| 2009/0042644 | A1 | 2/2009 | Zielinski |
| 2009/0042645 | A1 | 2/2009 | Graham et al. |
| 2009/0111573 | A1* | 4/2009 | Iddings ............... G07F 17/3244 463/25 |
| 2009/0111574 | A1 | 4/2009 | Rowe |
| 2009/0117989 | A1* | 5/2009 | Arezina .................. G07F 17/32 463/20 |
| 2009/0117993 | A1 | 5/2009 | Bigelow et al. |
| 2009/0189351 | A1 | 7/2009 | Baerlocher et al. |
| 2009/0325686 | A1 | 12/2009 | Davis et al. |
| 2010/0216544 | A1* | 8/2010 | Hamlin ................... G07F 17/32 463/25 |
| 2010/0225060 | A1* | 9/2010 | Dargue ..................... A63F 1/00 273/292 |
| 2010/0255912 | A1* | 10/2010 | Ward .................... G07F 17/323 463/36 |

(56) References Cited

U.S. PATENT DOCUMENTS

| | | | | |
|---|---|---|---|---|
| 2010/0285860 | A1 | 11/2010 | Svanas | |
| 2011/0014971 | A1* | 1/2011 | Ward | G07F 17/32 463/25 |
| 2011/0207522 | A1* | 8/2011 | Girafi | G07F 17/32 463/22 |
| 2011/0212767 | A1* | 9/2011 | Barclay | G07F 17/32 463/25 |
| 2012/0165090 | A1 | 6/2012 | Duffy | |
| 2012/0216130 | A1 | 8/2012 | Porro et al. | |
| 2013/0252693 | A1* | 9/2013 | Arnone | G07F 17/329 463/17 |
| 2013/0281192 | A1 | 10/2013 | Arnone et al. | |
| 2014/0128163 | A1 | 5/2014 | Almog | |

FOREIGN PATENT DOCUMENTS

| | | |
|---|---|---|
| WO | WO 9727570 | 7/1997 |
| WO | WO 9910849 | 3/1999 |
| WO | WO 02099760 | 12/2002 |

* cited by examiner

CONDUCTING A SIDE BET IN A GAME

PRIORITY CLAIM

This patent application is a continuation of, and claims priority to and the benefit of, U.S. patent application Ser. No. 14/013,929, which was filed on Aug. 29, 2013, the entire contents of which are incorporated herein by reference.

BACKGROUND

1. Field of the Described Embodiments

The present disclosure relates generally to gaming machines, and more particularly to a gaming machine configured to allow a side wager to be made among players of different machines.

2. Description of the Related Art

Many of today's gaming casinos and other entertainment locations feature different single and multi-player gaming systems, such as slot machines and video poker machines, that enable players to play wager-based games. Wager-based games generally refer to games in which a player risks a certain amount of money or credits on a round of gameplay. If the outcome of the round is favorable to the player, he or she may be awarded an amount of money or credits equal to or greater than the amount risked by the player. However, if the outcome of the round of gameplay is unfavorable to the player, the player loses the risked amount and receives nothing.

Gaming machines are highly regulated to ensure fairness. In many cases, gaming machines may be operable to dispense monetary awards of a large amount of money. Accordingly, access to gaming machines is often carefully controlled. For example, in some jurisdictions, routine maintenance requires that extra personnel (e.g., gaming control personnel) be notified in advance and be in attendance during such maintenance. Additionally, gaming machines may have hardware and software architectures that differ significantly from those of general-purpose computers (PCs), even though both gaming machines and PCs employ microprocessors to control a variety of devices. For example, gaming machines may have more stringent security requirements and fault tolerance requirements. Additionally, gaming machines generally operate in harsher environments as compared with PCs.

In many casinos and other entertainment locations, the types of wagers that a player of a gaming machine can make are typically predefined. For example, a player of a slot machine may be restricted to placing an in-game wager between a minimum and maximum amount. Moreover, the player may be restricted to wagering against the "house," i.e., the operator of the casino or other location. In other words, the player's winnings are paid out to the player by the operator of the establishment and the player's losses are paid directly to the operator of the establishment.

SUMMARY

According to various example embodiments, a method of conducting a side bet in a wager-based game is disclosed. The method includes receiving, at a processing circuit, side bet parameters that control how the side bet is conducted, the side bet parameters including a specified in-game event. The method also includes generating the side bet using the side bet parameters and linking the side bet to accounts of participants of the side bet. The method further includes monitoring, by the processing circuit, gameplay in a plurality of instances of the game by the participants of the side bet. The method additionally includes determining, by the processing circuit, a winner of the side bet from among the participants based on the in-game event occurring in an instance of the game played by the winner. The method yet further includes apportioning funds associated with the side bet to the winner of the side bet.

According to another embodiment, a system for conducting a side bet in a game is disclosed. The system includes a processing circuit configured to receive side bet parameters that control how the side bet is conducted, the side bet parameters including a specified in-game event. The processing circuit is also configured to generate the side bet using the side bet parameters and to link the side bet to accounts of participants of the side bet. The processing circuit is further configured to monitor gameplay in a plurality of instances of the game by the participants of the side bet. The processing circuit is also configured to determine a winner of the side bet from among the participants based on the in-game event occurring in an instance of the game played by the winner. The processing circuit is additionally configured to apportion funds associated with the side bet to the winner of the side bet.

According to a further embodiment, a computer-readable storage medium having machine instructions stored therein is disclosed. The instructions are executable by a processor to cause the processor to perform operations. The operations include receiving side bet parameters that control how the side bet is conducted, the side bet parameters including a specified in-game event. The operations also include generating the side bet using the side bet parameters. The operations further include linking the side bet to accounts of participants of the side bet and monitoring gameplay in a plurality of instances of the game by the participants of the side bet. The operations yet further include determining a winner of the side bet from among the participants based on the in-game event occurring in an instance of the game played by the winner. The operations also include apportioning funds associated with the side bet to the winner of the side bet.

These embodiments are mentioned not to limit or define the scope of the disclosure, but to provide example implementations of the disclosure to aid in the understanding thereof. Particular embodiments may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the descriptions, the drawings, and the claims, in which:

Like reference numbers and designations in the various drawings indicate like elements.

DETAILED DESCRIPTION

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

According to various embodiments disclosed herein, electronic gaming machines, such as those used in casinos and other entertainment locations, may be configured to allow players to place side bets among one another. A side-bet generally refers to a wager that may be made across different instances of one or more wager-based games and may be contingent on an in-game event occurring in one of the instances. For example, players that are all playing instances of the same slot game may place side wagers contingent on one of the players achieving a specified in-game goal, such as one of the players receiving a '7' along the payline in three rounds of gameplay in a row.

In various embodiments, side bets can be based off of the outcomes of the games played on the electronic gaming machines. For example, the first player that participates in the side bet to get four aces in a video poker game may win the pot of the side bet. In some implementations, a side bet may be a progressive payout in which the total pot increases over time as the players continue playing their respective gaming machines. For example, the total pot of the side bet may be funded by taking a percentage of the players' winnings during gameplay. Thus, the longer the players play the game, the larger the pot of the side bet will likely become. Side bets may be configured by a player according to any number of different parameters specified by the user setting up the side bet. Example parameters may include, but are not limited to, parameters that control how many players may join the side bet, which players can join the side bet, how the pot is funded, whether players can join the side bet later on (e.g., allowing late players to buy into the side bet), and other such parameters. In one embodiment, a side bet template may be provided to the player to facilitate setup of a side bet. The template may be predefined by the system (e.g., containing the most likely used parameters) and saved by a player for later use, in some embodiments. Notifications may also be provided to the various machines regarding the status of the side bet, such as when the side bet becomes active, the current level of the pot, when the pot is won and by whom, and other such notifications.

Figure 1:
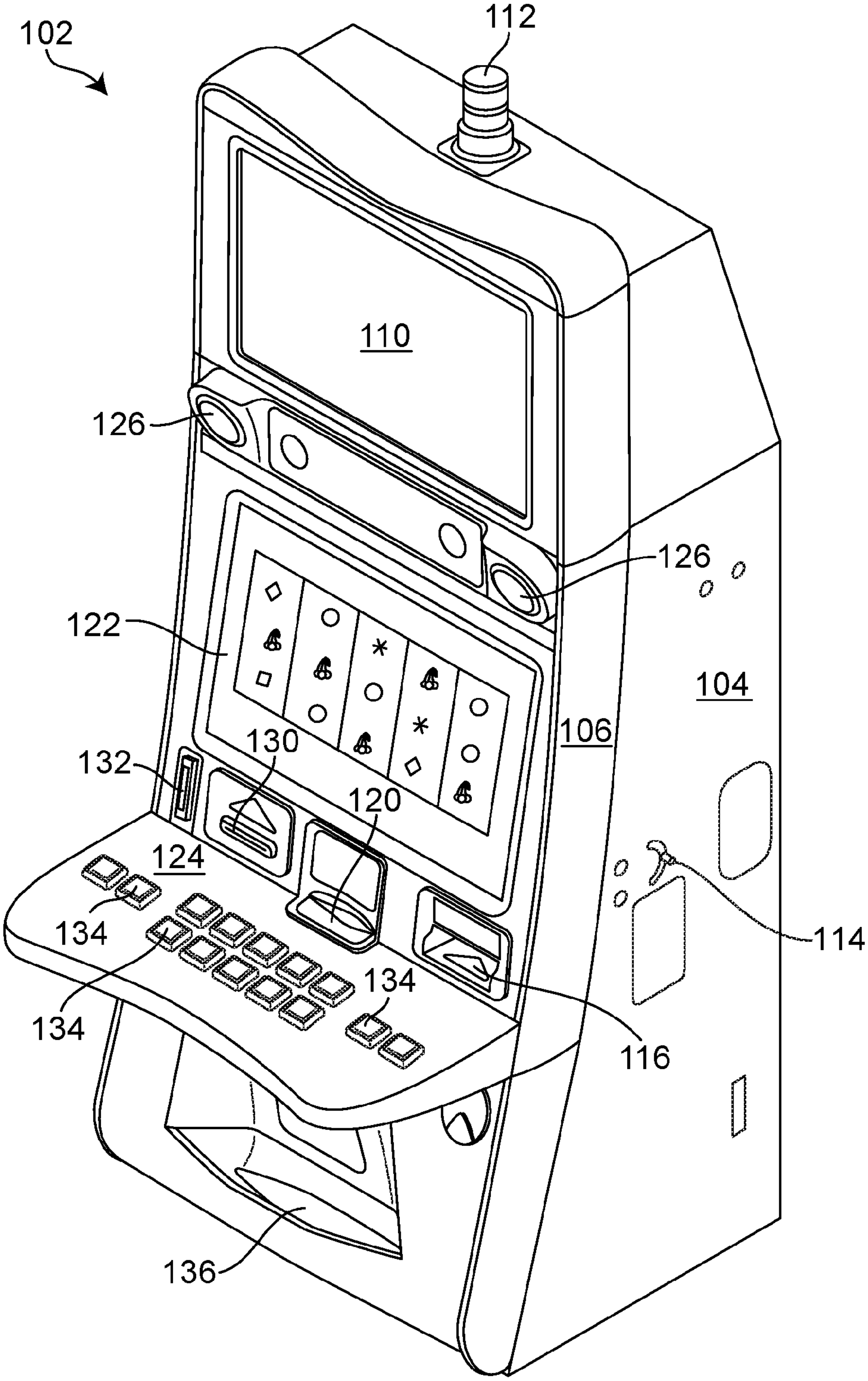
FIG. 1 is an illustration of a gaming machine, according to an exemplary embodiment.

Referring to FIG. 1, a perspective drawing of an electronic gaming machine 102 is shown in accordance with described embodiments. Gaming machine 102 may include a main cabinet 104. Main cabinet 104 may provide a secure enclosure that prevents tampering with device components, such as a game controller (not shown) located within the interior of main cabinet 104. Main cabinet 104 may include an access mechanism, such as a door 106, which allows the interior of gaming machine 102 to be accessed. Actuation of a door 106 may be controlled by a locking mechanism 114. In some embodiments, locking mechanism 114, door 106, and the interior of main cabinet 104 may be monitored with security sensors of various types to detect whether the interior has been accessed. For instance, a light sensor may be provided within main cabinet 104 to detect a change in light-levels when door 106 is opened and/or an accelerometer may be attached to door 106 to detect when door 106 is opened.

Gaming machine 102 may include any number of user interface devices that convey sensory information to a user and/or receive input from the user. For example, gaming machine 102 may include electronic displays 110, 122, speakers 126, and/or a candle device 112 to convey information to the user of gaming machine 102. Gaming machine 102 may also include a console 124 having one or more inputs 134 (e.g., buttons, track pads, etc.) configured to receive input from a user. In one embodiment, display 110 and/or display 122 may also be a touch screen display configured to receive input from a user. A controller (not shown) within gaming machine 102 may run a game, such as a wager-based game, in response to receiving input from a user via inputs 134, display 122, or display 110. For example, inputs 134 may be operated to place a wager in the game and to run the game. In response, the controller may cause reels shown on display 122 to spin, such as with a software-based slot game.

Gaming machine 102 may also include devices for conducting a wager-based game. For example, gaming machine 102 may include a ticket acceptor 116 and a printer 120. In various embodiments, gaming machine 102 may be configured to run on credits that may be redeemed for money and/or other forms of prizes. Ticket acceptor 116 may read an inserted ticket having one or more credits usable to play a game on gaming machine 102. For example, a player of gaming machine 102 may wager one or more credits within a video slot game. If the player loses, the wagered amount may be deducted from the player's remaining balance on gaming machine 102. However, if the player wins, the player's balance may be increased by the amount won. Any remaining credit balance on gaming machine 102 may be converted into a ticket via printer 120. For example, a player of gaming machine 102 may cash out of the machine by selecting to print a ticket via printer 120. The ticket may then be used to play other gaming machines or redeemed for cash and/or prizes. According to various embodiments, gaming machine 102 may record data regarding its receipt and/or disbursement of credits. For example, gaming machine 102 may generate accounting data whenever a result of a wager-based game is determined. In some embodiments, gaming machine 102 may provide accounting data to a remote data collection device, allowing the remote monitoring of gaming machine 102.

In one embodiment, gaming machine 102 may include a loyalty card acceptor 130. In general, a loyalty card may be tied to a user's loyalty account. A loyalty account may store various information about the user, such as the user's identity, the user's gaming preferences, the user's gaming habits (e.g., which games the user plays, how long the user plays, etc.), or similar information about the user. A loyalty account may also be used to reward a user for playing gaming machine 102. For example, a user having a loyalty account may be given a bonus turn on gaming machine 102 or credited loyalty points for playing gaming machine 102. Such loyalty points may be exchanged for loyalty rewards (e.g., a free meal, a free hotel stay, free room upgrade, discounts, etc.).

Figure 2:
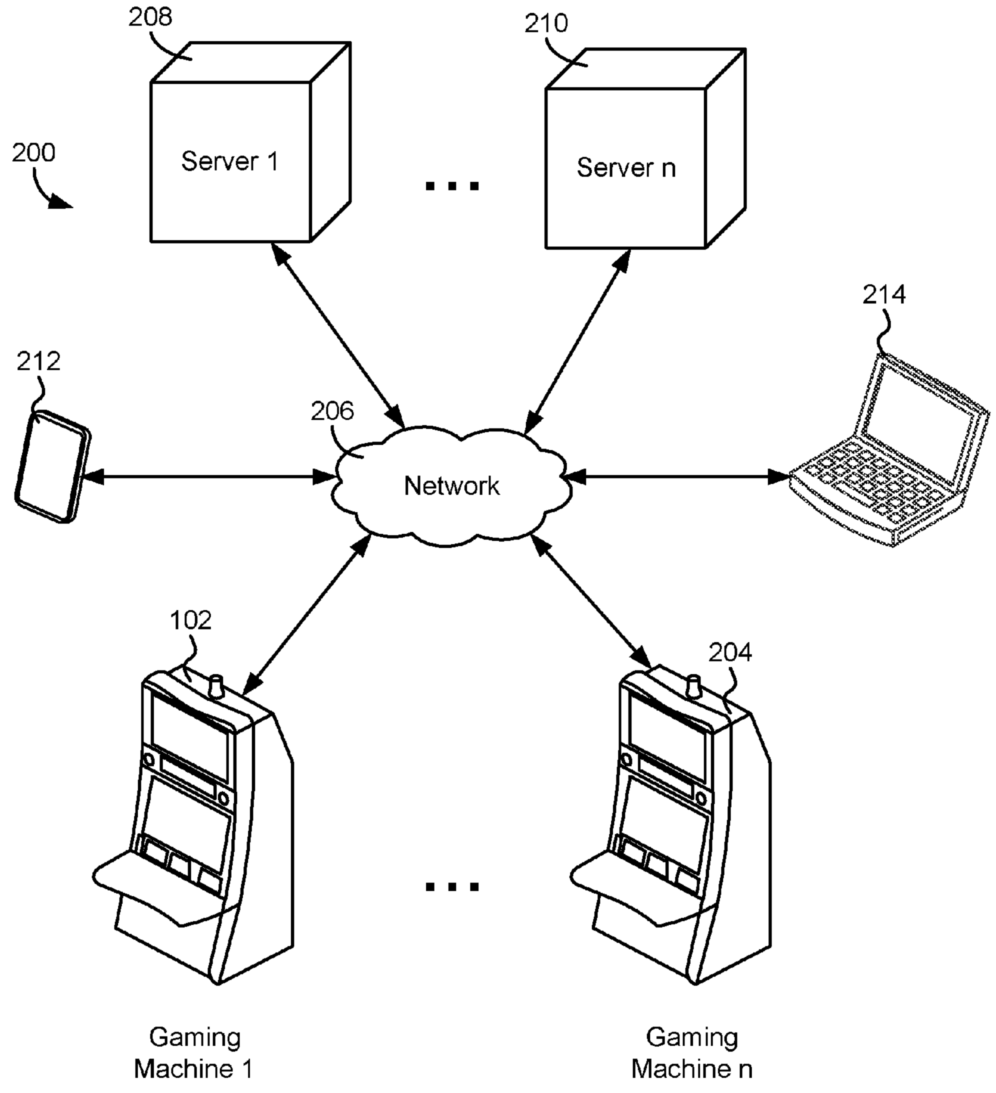
FIG. 2 is an illustration of a gaming system, according to an exemplary embodiment.

Referring now to FIG. 2, an illustration of a gaming system 200 is shown, according to an exemplary embodiment. In general, gaming system 200 is configured to allow any number of players to play instances of one or more wager-based games and to place side bets in the game instances. The players may all be located within the same entertainment location, located in different entertainment locations (e.g., different casinos), or may even be located outside of a gaming location altogether (e.g., remote players playing online games).

As shown, gaming system 200 may include any number of gaming machines, which may be located physically within one or more entertainment locations, such as casinos, racetracks, bars, etc. For example, gaming system 200 may include gaming machine 102 shown in FIG. 1 through a gaming machine 204 (i.e., a first gaming machine through nth gaming machine) on which wager-based games may be played. In further embodiments, gaming system 200 may include desktop computing devices, such as a desktop device 214, and/or mobile computing devices, such as a mobile device 212, which are configured to play wager-based games remotely. Gaming system 200 may also include any number of servers and other devices, such as server 208 through server 210 (e.g., a first server through nth server), which support the various functions described herein. Gaming environment may further include a network 206 through which gaming machines 102, 204, mobile device 212, desktop device 214, and/or servers 208, 210 communicate.

Network 206 may be any form of communications network that conveys data between gaming machines 102, 204 and servers 208, 210. In one embodiment, network 206 may also convey data between gaming machines 102, 204. For example, gaming machines 102, 204 may be gaming machines that execute a particular type of game that allows for social gaming (e.g., a player of gaming machine 102 may coordinate some of his or her in-game actions with the player of gaming machine 204, to achieve certain collaborative goals, bonuses, etc.). Network 206 may include any number wired or wireless connections, in various embodiments. For example, server 208 may communicate with server 210 over a wired connection that includes a serial cable, a fiber optic cable, a CAT5 cable, or any other form of wired connection. In another example, server 208 may communicate with gaming machine 102 via a wireless connection (e.g., via WiFi, cellular, radio, etc.). Network 206 may also include any number of local area networks (LANs), wide area networks (WANs), or the Internet. For example, server 210 may communicate with gaming machine 102 via a casino's LAN and with mobile device 212 via the Internet. Accordingly, network 206 may include any number of intermediary networking devices, such as routers, switches, servers, etc.

In various embodiments, servers 208, 210 and gaming machines 102, 204 may utilize a gaming protocol, such as G2S or SAS, to communicate via network 206. Such a gaming protocol may include security features to ensure the integrity of communications between the devices in gaming system 200. For example, a communication between gaming machine 102 and server 208 using G2S may be encrypted using a secure socket layer (SSL) encryption technique. The communication may then be decrypted by the receiving device, thereby ensuring the integrity of the communicated data.

Mobile device 212 and desktop device 214 may each be computing devices having a processor and memory coupled thereto. Stored in the memories are machine instructions that, when executed by the processors, cause the processors to perform the operations described herein. In some embodiments, mobile device 212 and/or desktop device 214 are configured to execute gaming applications that allow their respective players to play wager-based games. For example, a gaming application executed by desktop device 214 may allow a player to play online poker and place wagers within the game. In a further embodiment, mobile device 212 may be configured to interface with gaming machines 102, 204. For example, mobile device 212 may communicate with gaming machine 204 during gameplay to control the gameplay, identify the player to gaming machine 204, or perform other such functions.

Servers 208, 210 may each be a single computing device or a collection of computing devices (e.g., a data center, cloud computing devices, etc.) that communicate via network 206. Each of servers 208, 210 may include one or more processors that execute machine instructions stored in electronic memories. In one embodiment, one or more of servers 208, 210 are configured to maintain an accounting of wager-based games played at gaming machines 102, 204, mobile device 212, and/or desktop device 214. In other words, one or more of servers 208, 210 may receive data regarding the cash in, cash out, and game outcomes of the games played at gaming machines 102, 204. For example, server 208 may receive data indicative of gaming machine 102 having received $5 in currency from a player. One or more of servers 208, 210 may also be configured to provide an accounting for remote players. For example, one or more of servers 208, 210 may store data indicative of the amount of funds added to the gaming account of the player using desktop device 214 (e.g., from a financial institution), transferred from the gaming account (e.g., deposited into the player's bank account), or changes to the amount of funds associated with the gaming account due to game outcomes.

One or more of servers 208, 210 may be configured to determine the outcome of a wager-based game played on gaming machines 102, 204, mobile device 212, or desktop device 214. For example, server 210 may provide the result of a round of gameplay to gaming machine 204. In some embodiments, server 210 may serve a thin client game to some or all of gaming machines 102, 204, mobile device 212, and desktop device 214. In contrast to thick client games, thin client games generally refer to gaming applications in which the game logic is executed on a remote device, such as server 210, and provided to another device running a thin client (e.g., gaming machine 204, mobile device 212, desktop device 214, etc.). For example, the game logic may be executed on server 210 and graphics representing the outcome of the game may be provided to gaming machine 204 for display within a thin client (e.g., Adobe Flash or another such application).

In some cases, servers 208, 210 may be configured to perform data analysis on data received from any of gaming machines 102, 204, mobile device 212, or desktop device 214. For example, one or more of servers 208, 210 may determine averages, trends, metrics, etc., for one or more of gaming machines 102, 204. Data may be sent between gaming machines 102, 204, mobile device 212, desktop device 214 and servers 208, 210 in real-time (e.g., whenever a change in credits or cash occurs, whenever another type of system event occurs, etc.), periodically (e.g., every fifteen minutes, every hour, etc.), or in response to receiving a message from one of the devices.

One or more of servers 208, 210 may be configured to maintain player loyalty accounts. In general, a loyalty account may include information about the player's identity, rewards or loyalty points earned by the player (e.g., for playing wager-based games, on the player's birthday, etc.), data linking the player's account to an account with a financial institution (e.g., to add game credits to the player's account, to cash out game credits, etc.), or other such information. For example, a user of gaming machine 102 may link his or her loyalty account to gaming machine 102, so that he or she can gain loyalty points, free turns, etc., while playing gaming machine 102. A user may link his or her loyalty account to a gaming machine in any number of ways. For example, the user may insert a loyalty card into gaming machine 102, provide biometric data to gaming machine 102 (e.g., by conducting a finger print scan, a retinal scan, etc.), and so on. In some cases, mobile device 212 operated by the user may provide data regarding the user's loyalty account to gaming machine 102. Mobile device 212 may transfer data to gaming machine 102 wirelessly (e.g., via Bluetooth, WiFi, etc.), via a wired connection (e.g., via a USB cable, a docking station, etc.), via the user's body (i.e., the mobile device transmits data through the user's body and into gaming machine 102), or in another manner. The receiving server may then associate the user's time playing gaming machine 102 with the user's loyalty account (e.g., to add loyalty points to the user's account, to provide certain rewards to the user, such as a bonus turn, etc.).

According to various implementations, one or more of servers 208, 210 are configured to allow players in gaming system 200 to place side bets that are contingent on the outcomes of games played by the players. For example, assume that the players of gaming machines 102, 204 are each playing instances of the same video blackjack game. As a side wager, the players may agree to contribute a certain amount of credits to a pool that will get awarded to the next player that gets a blackjack. Any form of in-game event may be defined in servers 208, 210 for a side bet. A pot used for a side bet may be funded using fixed contributions by the participating players or as a progressive payout, in various embodiments. For example, a percentage of each player's winnings in the different instances of the game may be siphoned off to fund the side pot until the winning in-game event occurs for one of the players.

A side bet made between players in gaming system 200 may be configured by one of the players or may even be configured by a non-player observer. For example, the user of mobile device 212 may be watching the player operating gaming machine 102 and set up a side bet via gaming system 200. In another example, gaming machine 102 may present the player of the machine with a graphical interface to set up a side wager with other users of gaming system 200. During creation of a side bet, any number of parameters may be set to control how the side bet is run. Example parameters may include, but are not limited to, parameters that control which in-game event triggers the pot being awarded to a participant, how many participants are allowed to join the side bet (e.g., a minimum and/or maximum number of participants), how the pot of the side bet is funded, which players are allowed to join the side bet, whether participants may join the side bet after the wager has started (e.g., by buying into the pot), or any other parameter that controls how the side bet operates. In some embodiments, sets of parameters may be saved as templates, allowing the organizer of a side bet to quickly set up the wager.

After creation of a side bet, servers 208, 210 may receive data from gaming machines 102, 204, mobile device 212, and/or desktop device 214 regarding gameplay of the wager-based game available at these devices. Servers 208, 210 may use the received data to administer the side bet, such as funding the pot of the side bet using game credits, determining whether the winning in-game event has occurred in one of the instances of the game, which side bet participant is the winner of the pot, or other such administrative functions. In one embodiment, a portion of the side bet's pot may be apportioned to the proprietor of gaming system 200 (e.g., the house may receive a percentage of the pot in exchange for administering the side bet). In another embodiment, the pot amount may be split entirely among the participants of the side bet. For example, the proprietor of gaming system 200 may administer a side bet with a progressive payout for free to incentivize the participants of the side bet to continue playing the wager-based game.

Figure 3:
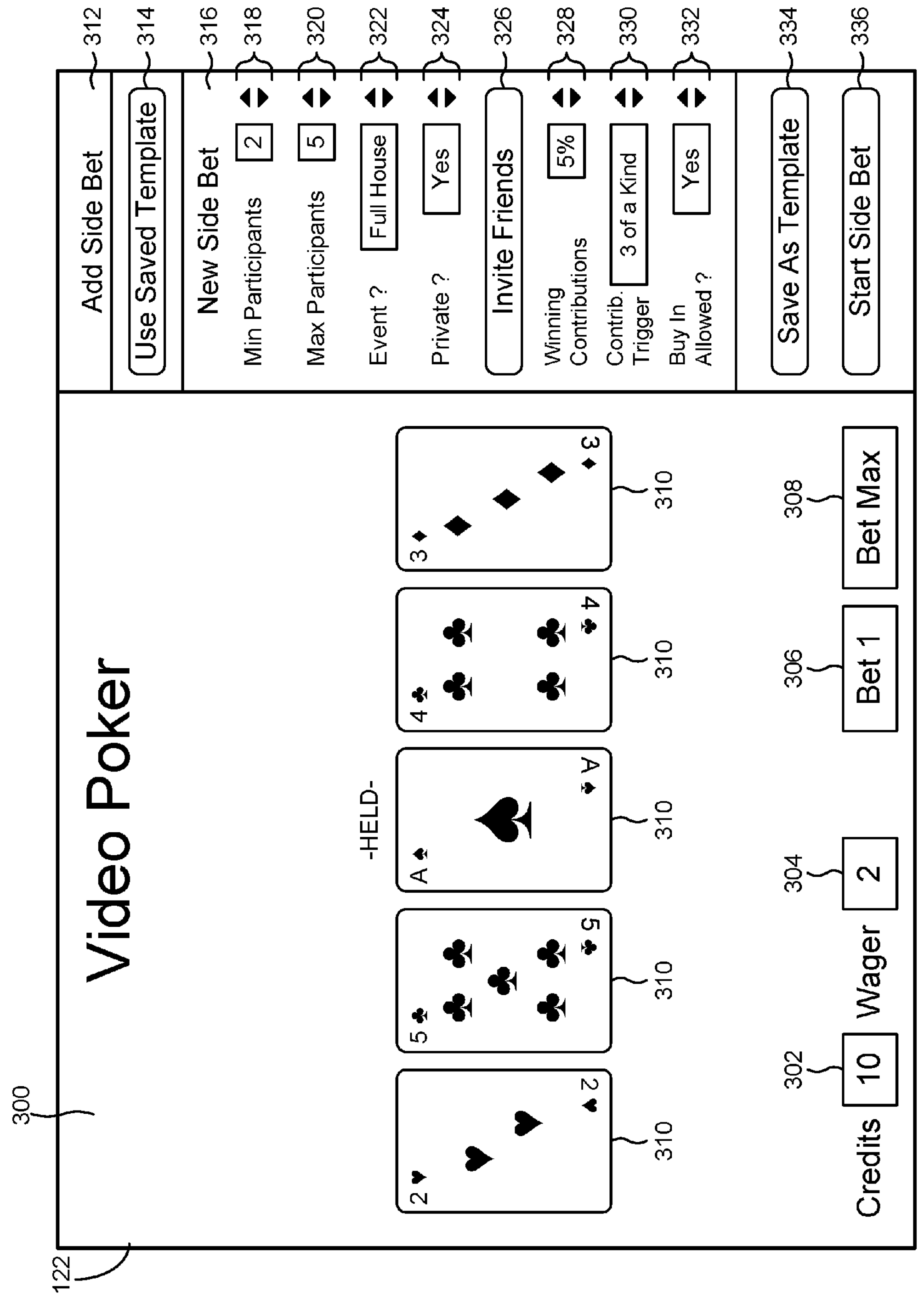
FIG. 3 is an illustration of a configuration screen to set up a side bet on a gaming machine, according to an exemplary embodiment.

Referring now to FIG. 3, an illustration is shown of a configuration screen to set up a side bet on a gaming machine, according to an exemplary embodiment. In the example shown, an instance of a wager-based game 300 may be provided to display 122 of gaming machine 102 shown in FIGS. 1-2. In one embodiment, wager-based game 300 is a thick client game in which the graphics and logic of the game are stored and executed locally by gaming machine 102. In another embodiment, wager-based game 300 is a thin client game in which the logic of the game is executed remotely by another device, such as server 208, and display data for the game is provided to gaming machine 102. For example, wager-based game 300 may be an Adobe Flash™ game, a Hypertext Transfer Protocol 5.0 (HTML 5) game, or the like, that displays the game outcome determined by the remote server.

Wager-based game 300 may be any form of electronic game in which players are able to bet game credits on the outcome of a round of gameplay. Examples of wager-based games may include, but are not limited to, slot-based games, video poker games, video blackjack games, any other form of electronic card games, video bingo and keno games, or the like. In the example of FIG. 3, wager-based game 300 is a video poker game in which five cards 310 are dealt to the player in each round of gameplay after a wager is made. Game 300 may include an indication 302 of the number of game credits the player currently has, an indication 304 of the current wager made by a player in a round of gameplay, an input 306 to bet a single credit, an input 308 to bet the maximum allowed wager, or other controls to place a wager on a round of gameplay. During the round of gameplay, game 300 may allow the player to "hold" some or all of cards 310. Any card that is not held is then replaced by a newly dealt card. Based on the combination of cards and the current wager, the player is then either awarded a certain amount of credits or loses the wagered credits. For example, wager-based game 300 may pay out a minimum amount if the player has two pairs or better.

In various embodiments, a configuration screen 312 may be provided to display 122 of gaming machine 102. Configuration screen 312 is configured to allow the player of gaming machine 102 to set up a side bet for game 300. In one embodiment, configuration screen 312 is provided to display 122 in conjunction with wager-based game 300. For example, configuration screen 312 may be provided to display 122 in a service window, which may be a Flash-based window or the like, that occupies a portion of display 122 while game 300 is being displayed (e.g., along an edge of display 122). In other embodiments, configuration screen 312 may be a pop-up window, a separate window entirely from game 300, or presented on a different display, such as display 110 of gaming machine 102. In a further embodiment, configuration screen 312 may even be provided to the display of a different device than that of gaming machine 102. For example, gaming machine 102 may be in communication with a mobile device, such as mobile device 212, and provide configuration screen 312 to a display of the mobile device (e.g., the player of gaming machine 102 or a person nearby may be allowed to configure a side bet via configuration screen 312 using a mobile device). In a further embodiment, game 300 and/or configuration screen 312 may be provided to the display of a remote user's device, such as a remote desktop device (e.g., a device operated by an online poker player). In yet another embodiment, configuration screen 312 may be provided to a device of a non-player administrator. For example, assume that a bar has several gaming machines at which game 300 may be played. In such a case, the bartender or other person associated with the bar may operate configuration screen 312 to administer a side bet among the players of the gaming machines.

Configuration screen 312 may include any number of inputs to set the parameters of the side bet. In one embodiment, configuration screen 312 includes an option 314 to load a predefined template for a side bet. In general, a side bet template is a collection of predefined parameters for a side bet that may be reused. Templates may be specific to a player (e.g., associated with the player's loyalty account) or may be generic to all players. For example, configuration screen 312 may include an option 334 that allows the player of gaming machine 102 to save his or her parameters for later use. In another example, predefined side bet templates may be set by the manufacturer of game 300, by the proprietor of a gaming establishment, or another such individual to facilitate the use of side bets by players. Side bet templates may be shared among players (e.g., among socially connected accounts), in some cases. For example, a player may set up a side bet, save the parameters of the side bet as a template, and share the template with his or her friends to repeat the side bet at a later time.

Configuration screen 312 may include a screen area 316 that has options to set up a new side bet. On screen area 316 may be an option 318 to set a minimum number of participants in the side bet. When a minimum number of participants is set, the side bet may remain inactive until the specified number of participants is reached. For example, the pot of the side bet remains unfunded until the side bet has the specified minimum number of participants. Screen area 316 may include an option 320 to specify a maximum number of participants in the side bet. If a maximum number of participants is set, players may be prevented from joining the side bet once the maximum number of participants is reached. For example, once the side bet has five participants, the side bet may be closed to further participants. In general, side bet participants are players of different instances of wager-based game 300. For example, the side bet participants may also be playing an instance of game 300 on other gaming machines in the same casino as the player of gaming machine 102, on other gaming machines in other casinos or other gaming locations, or may even be Internet players (e.g., players playing instances of game 300 via the Internet). In one embodiment, side bet participants may also include non-players, such as observers of game 300. For example, a non-player observer of gaming machine 102 may be allowed to participate in a side bet with the player of gaming machine 102 (e.g., the observer may win some or all of the side bet based on the in-game events for the player of gaming machine 102).

Configuration screen 312 may include an input 322 via which an in-game event for game 300 may be specified. The in-game event specified by input 322 may be used to determine the winner of the side bet. As shown, for example, the in-game event triggering the winner of the side bet is a full house. In other words, the first player of an instance of game 300 that participates in the side bet to get a full house wins the pot of the side bet. If a non-player observer also participates in the side bet, he or she may be associated with a player of game 300 (e.g., the outcome of that player's game may control whether the non-player observer wins the pot). Any side bet participant associated with the game in which the in-game event occurs may share the pot of the side bet. The list of eligible in-game events on configuration screen 312 may be a function of the type of wager-based game associated with the side bet. For example, a slot based game may have corresponding slot-based events available for selection by input 322 (e.g., certain symbols appearing in the game, a certain combination of symbols occurs in-game, etc.).

In one embodiment, configuration screen 312 includes an option 324 that allows the side bet to be set up as either public or private. If the side bet is public, the side bet may be open to any participant. For example, other players of game 300 may receive an invitation to join the side bet, regardless of their connection to the player setting up the side bet. If the side bet is private, however, only certain individuals may be eligible to join the side bet. In some cases, configuration screen 312 may include an option 326 to specify which individuals are eligible to participate in the side bet. In one embodiment, the loyalty account of the player of gaming machine 102 may be associated with accounts of other players (e.g., the player's account may include a "friends list" of other accounts). Selection of option 326 may present the friends list on display 122 to select which friends are eligible to participate in the side bet. Such a list may include, for example, an indication of which individuals on the list are also currently playing instances of game 300. In a further embodiment, the friends list may be retrieved from a social networking service. In some embodiments, a side bet created via configuration screen 312 may be limited to certain machines. For example, invitations to participate in the side bet may only be sent to gaming machines located in the same bank as the that of gaming machine 102, within a certain distance or area relative to gaming machine 102, within the same gaming environment (e.g., casino, bar, race track, etc.), etc. In other embodiments, any gaming machine or other device on the same network as gaming machine 102 may be eligible to receive an invitation to participate in the side bet.

Configuration screen 312 may also include various parameters that control how the pot of a side bet is funded. In one embodiment, configuration screen 312 includes an input 328 that allows the pot to be funded as a percentage of the participants' winnings in game 300 (e.g., as a progressive pot that increases in size as players play game 300). For example, 5% of all winnings may be siphoned off from the players and held as part of the pot of the side bet until the in-game event specified by input 322 occurs in one of the instances of the game. In a further embodiment, input 328 may include an option to set a fixed contribution amount for each participant (e.g., each participant wagers $1 in the side bet). Configuration screen 312 may include an option 330 to specify a triggering event to fund the pot of the side bet. For example, the pot may be funded whenever a player receives three of a kind or higher in game 300. In a further embodiment, configuration screen 312 may include an option 332 to allow side bet participants to join the side bet after the bet has started. Since the current participants have already contributed to the pot of the side bet, a new player may still be allowed to join in the side bet, but must first buy into the pot. Buying into the pot may require contribution of a fixed amount (e.g., the same fixed amount contributed by the existing participants), an average of the contributions of the existing participants, or any other amount. In other words, the pot may be funded using the winnings of players that are currently participating in the side bet as well as any buy-in amounts contributed to the pot by players that are latecomers to the side bet.

Once a new side bet has been defined via configuration screen 312, selection of option 334 may allow the side bet administrator to save the new bet parameters as a template for later use. If saved, the stored template may be recalled at a later time via selection of option 314. The template may be named, in some implementations, to allow the user to quickly identify the template. In one embodiment, option 334 may also include the option to share a newly created template with other users, such as the individuals invited to participate in the side bet or others.

After setting the parameters of the side bet via configuration screen 312, the user may select option 336 to activate the side bet. In response, the parameters of the side bet may be communicated to the server overseeing the side bet, such as server 208 shown in FIG. 2. Server 208 may then send invitations to the eligible participants of the side bet (e.g., public players actively playing game 300, specific players indicated via 326, etc.). If a minimum number of players is specified, server 208 may monitor the acceptances to determine when to start the side bet. During each round of gameplay of an instance of game 300, server 208 may receive an indication of the results of the round. For example, server 208 may receive an indication that the latest round of gameplay on gaming machine 102 resulted in cards 310 being distributed to the player. Server 208 may compare the results of the round to the in-game event specified via option 322 to determine whether the pot of the side bet has been won. Server 208 may also determine when and how the pot of the side bet is funded based on the gameplay results. For example, server 208 may apportion a percentage of a player's winnings in an instance of game 300 to the pot if the player won a round of gameplay in game 300 but did not win the side bet.

Figure 4:
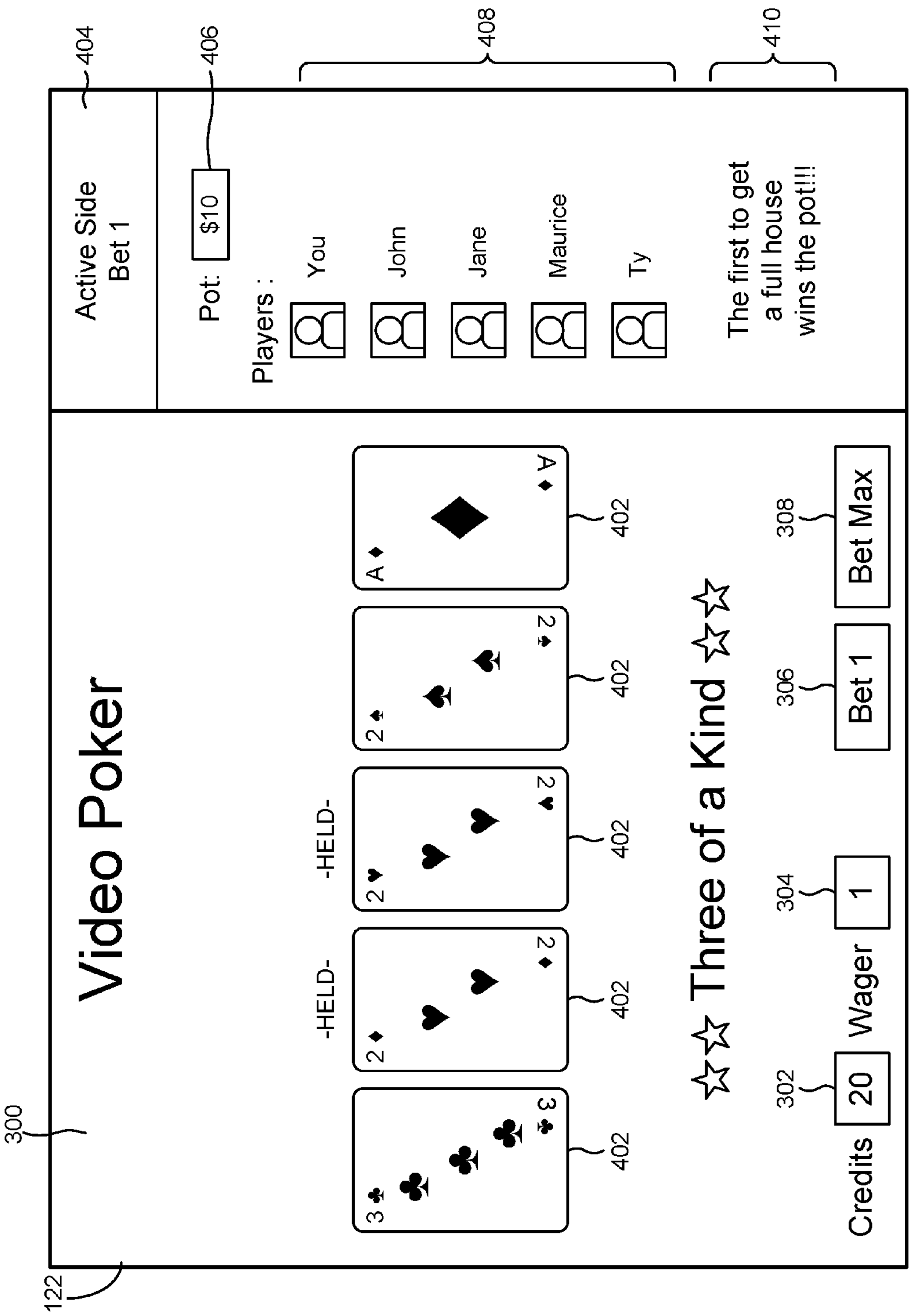
FIG. 4. is an illustration of a status screen for an active side bet shown on a gaming machine, according to an exemplary embodiment.

Referring now to FIG. 4, an illustration is shown of a status screen for an active side bet shown on a gaming machine, according to an exemplary embodiment. In the example shown, a side bet status screen 404 may be provided to an electronic display of a device associated with a participant of the side bet. For example, status screen 404 may be provided to display 122 of gaming machine 102 (e.g., within a service window, in conjunction with game 300, on a separate display, etc.). As shown, status screen 404 may be provided with an instance of game 300, thereby allowing the player of gaming machine 102 to monitor the current state of the side bet.

Continuing the example of FIG. 3, assume that cards 402 are in the hand of the player of game 300 after a round of gameplay. Since cards 402 include three cards of the same type (e.g., three deuces), the player has won the round of gameplay in his or her own instance of the game. However, since the player has not achieved a full house, he or she has not yet won the side bet. Prior to awarding credits to the player for the three of a kind, a percentage of the winnings may be apportioned to the pot of the side bet.

In general, status screen 404 includes information regarding the current state of a side bet. For example, server 208 may provide data to status screen 404 aggregated from all participants of the side bet. In one embodiment, the status screen 404 includes an invitation generated by the server overseeing the side bet to join in the side bet. For example, status screen 404 may include an option to join an open side bet. After joining, status screen 404 may indicate whether the side bet is now active or is still waiting for a minimum number of participants. For example, status screen 404 may indicate that two players have joined the side bet and that one more is needed for the side bet to become active. Status screen 404 may also include an indication regarding the number of players reaching a predefined maximum. For example, status screen 404 may indicate that four of the five available openings have been filled and that there is room for only one more participant in the side bet.

As shown, status screen 404 may include an indication 406 of the current amount of credits or money in the pot of the side bet. Each time a contribution is made to the pot, indication 406 may notify each participant of the side bet. In one embodiment, which player contributed to the pot may also be indicated on status screen 404. For example, based on the player of gaming machine 102 receiving three of a kind, his or her contribution to the pot of the side bet may be shown to the other participants of the side bet.

Status screen 404 may include an indication 408 of the current participants in the side bet. In one embodiment, indication 408 includes information regarding the actual identities of the participants. For example, if the side bet is a private side bet limited to socially connected accounts, indication 408 may include the names of the participants. In another embodiment, the actual identities of the participants may be hidden. For example, indication 408 may list "player 1," "player 2," etc., if the side bet is open to the public.

Status screen 404 may include other information about how the side bet is conducted. For example, status screen 404 may include an indication 410 regarding the in-game event that triggers the pot being won. For example, indication 410 may indicate that the first player of game 300 that is participating in the side bet to get a full house wins the pot indicated by indication 406. Other indications that may be included on status screen 404 can include data regarding any of the parameters set when setting up the side bet. For example, status screen 404, in some embodiments, may include indications of how the pot of the side bet is funded.

While FIGS. 3-4 are described with respect to placing a side bet in a video poker game, other in-game events for other types of games may be configured for use with a side bet, according to various embodiments. For example, an in-game event used to determine the winner of a side bet may correspond to a participant entering a bonus round in an instance of the slot game, getting a particular combination of symbols, or any other event occurring within the slot game. In another embodiment, a side bet may be set up across instances of different games that share a type of in-game event. For example, a side bet may be created across any number of different types of games (e.g., different slot games, different poker games, etc.) in which the in-game event used to determine the winner of the side bet corresponds to one of the participants winning a certain amount over time in the game, receiving a payout in a single round of gameplay over a threshold amount (e.g. the first player to win $10 in a round of gameplay wins the side bet), or the like.

Figure 5:
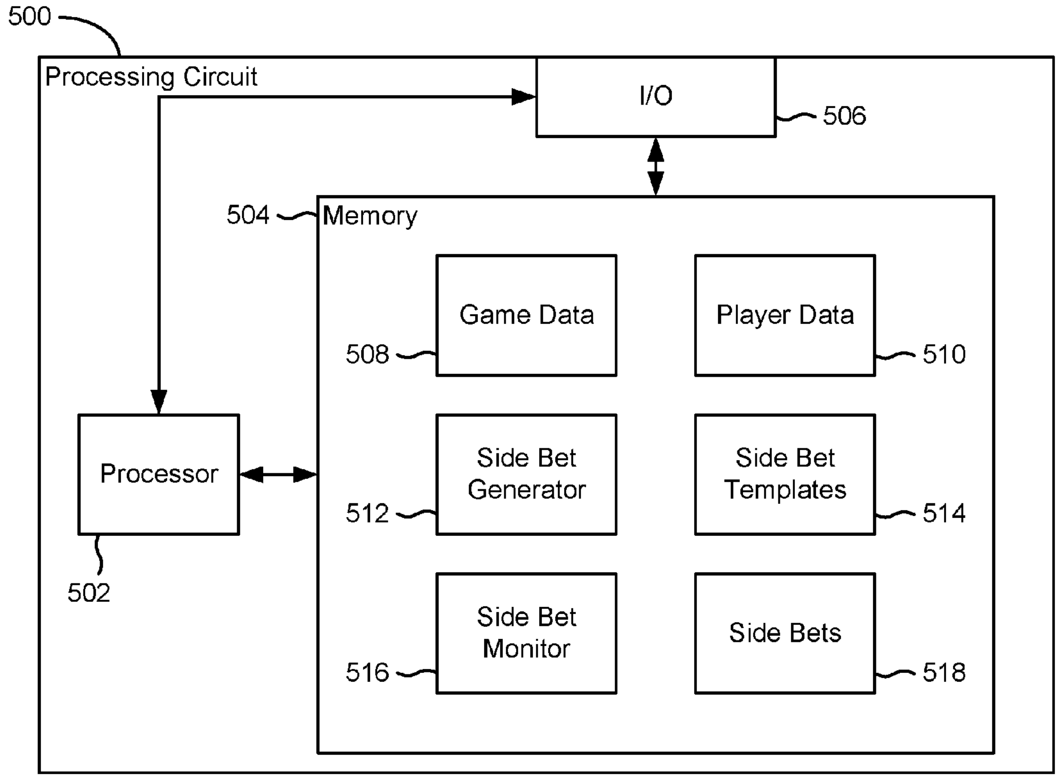
FIG. 5 is a block diagram of a processing circuit configured to allow the use of a side bet on a gaming machine, according to an exemplary embodiment.

Referring now to FIG. 5, a block diagram of a processing circuit 500 is shown, according to an exemplary embodiment. Processing circuit 500 may be a processing component of any electronic device used as part of a gaming environment. For example, any of servers 208, 210, gaming machines 102, 204, mobile device 212, or desktop device 214 shown in FIG. 2 may include processing circuit 500. In another embodiment, processing circuit 500 may be part of a computing system that includes multiple devices. In such a case, processing circuit 500 may represent the collective components of the system (e.g., processors, memories, etc.). For example, server 208 in communication with gaming machine 102 may form a processing circuit configured to perform the operations described herein.

Processing circuit 500 may include a processor 502 and a memory 504. Memory 504 stores machine instructions that, when executed by processor 502, cause processor 502 to perform one or more operations described herein. Processor 502 may include a microprocessor, FPGA, ASIC, any other form of processing electronics, or combinations thereof. Memory 504 may be any electronic storage medium such as, but not limited to, a floppy disk, a hard drive, a CD-ROM, a DVD-ROM, a magnetic disk, RAM, ROM, EEPROM, EPROM, flash memory, optical memory, or combinations thereof. Memory 504 may be a tangible storage medium that stores non-transitory machine instructions. Processing circuit 500 may include any number of processors and memories. In other words, processor 502 may represent the collective processing devices of processing circuit 500 and memory 504 may represent the collective storage devices of processing circuit 500. Processor 502 and memory 504 may be on the same printed circuit board or may be in communication with each other via a bus or other form of connection.

I/O hardware 506 includes the interface hardware used by processing circuit 500 to receive data from other devices and/or to provide data to other devices. For example, a command may be sent from processing circuit 500 to a controlled device of gaming machine 102 via I/O hardware 506. I/O hardware 506 may include, but is not limited to, hardware to communicate on a local system bus and/or on a network. For example, I/O hardware 506 may include a port to transmit display data to an electronic display and another port to receive data from any of the devices connected to network 206 shown in FIG. 2.

Processing circuit 500 may store game data 508 in memory 504. In general, game data 508 includes information about the operation of wager-based games at any number of electronic devices (e.g., gaming machines, mobile devices, desktop devices, etc.). Example data in game data 508 may include information regarding which game is being played by a player, the amount wagered by a player in a round of gameplay of the game, which in-game events occur during the round of gameplay (e.g., the player receives three aces, the player has a full house, etc.), the results of the round (e.g., the amount won or lost by the player), or any other information regarding the operation of a wager-based game. Game data 508 may be specific to one type of wager-based game (e.g., a specific type of video poker, video slot, etc.) or may include game data for any number of different games. In one embodiment, game data 508 is received via I/O hardware 506 from the devices. For example, processing circuit 500 may receive data regarding a round of gameplay on a gaming machine. In another embodiment, game data 508 is generated locally in memory 504. For example, if processing circuit 500 provides a thin client game to a device, game data 508 may be generated locally in memory 504 during execution of the game logic.

Memory 504 may store player data 510 which identifies players of the one or more wager-based games associated with game data 508. Player data 510 may include any information to identify an individual player, such as the player's name, phone number, address, contact information, or the like. In one embodiment, player data 510 corresponds to loyalty accounts held by individual patrons of a gaming establishment and/or online gaming service. For example, a player of a gaming machine may identify himself or herself by swiping a loyalty card, using a biometric reader, entering a screen name, or the like. Based on the information provided by the player, the player's account may be associated with the corresponding game data 508 for the player. For example, the player may earn loyalty points in his or her account based on the amount wagered by the player. Player data 510 may include data regarding social connections of players (e.g., friend lists, social contacts, etc.). Such lists may be specified by the player and associated with the player's account. In a further implementation, social connections may be associated with a player's account via an external social networking service (e.g., the player may link his or her loyalty account with his or her social networking account).

In various embodiments, memory 504 includes a side bet generator 512 configured to generate created side bets 518. Side bet generator 512 is configured to maintain and receive any number of parameters that control how a side bet in side bets 518 is to operate. In one embodiment, side bet generator 512 provides one or more screens to the display of a device having inputs for the side bet parameters. For example, side bet generator 512 may provide a configuration screen to a gaming machine within a service window to allow the player of the machine to set up a side bet. In another embodiment, side bet generator 512 receives the side bet parameters directly from the game itself. Example side bet parameters may include, but are not limited to, parameters that control how many participants may participate in the side bet, the in-game event that triggers the conclusion of the side bet (e.g., the event signifying that a participant has won the side bet), how the pot of the side bet is funded, whether participants may join the side bet at any time (e.g., by buying into the pot), or other such parameters. Side bet generator 512 may store any finalized set of side bet parameters in side bets 518 and provide an indication of the created side bet to a side bet monitor 516.

Memory 504 may include side bet templates 514 which are collections of side bet parameters used to configure a side bet. Side bet templates 514 may be stored by side bet generator 512 in response to a request from a user interface. For example, a player setting up a new side bet may save the parameters of the side bet for later use as a template in side bet templates 514. In some cases, side bet templates 514 may be predefined, such as by the manufacturer of a wager-based game, by the proprietor of a gaming location or gaming service, or by another such entity. For example, the maker of the wager-based game "Video Poker" may define any number of side bet templates to accompany the game. Side bet templates 514 may be associated with player data 510, in one embodiment. In other words, a particular side bet template may be owned or may only be accessible by certain accounts in player data 510. For example, a template in side bet templates 514 may be accessible only by the individual that created the template and/or any other individual specifically authorized to access the template (e.g., friends with whom the creator has shared the template, only players located in certain locations, etc.).

Memory 504 may also include side bet monitor 516, which is generally configured to monitor in-game activity of the participants of a side bet and to otherwise administer the created side bets 518. On creation of a new side bet by side bet generator 512, side bet monitor 516 may receive an indication of the newly created side bet. In response, side bet monitor 516 may generate invitations to eligible players or other participants to join in the newly created side bet. For example, side bet monitor 516 may send invitations to all players that are playing the game associated with the side bet, to a subset of players, or to a set of players specified by the creator of the side bet (e.g., the player's friends, etc.). Side bet monitor 516 may determine whether the side bet in side bets 518 is active, such as when a minimum number of participants have agreed to participate in the side bet. On activation, side bet monitor 516 may monitor wagers, winnings, or other financial information in game data 508 to fund the pot of the side bet. For example, side bet monitor 516 may analyze game data 508 indicating that a side bet participant has won a certain amount in a round of gameplay and may allocate a percentage of the winnings to the pot of the side bet. If a buy in is allowed in the side bet, side bet monitor 516 may debit funds from the participant joining the side bet. In some embodiments, side bet monitor 516 may generate notifications to the side bet participants regarding the status of the side bet. For example, participants may be notified by side bet monitor 516 regarding the current state of the pot, who is participating in the side bet, how the side bet is won, or other such information.

In some embodiments, side bet monitor 516 determines whether the side bet has been won by comparing a parameter specifying an in-game event from side bets 518 to game data 508. In response to detecting that a side bet has been won, side bet monitor 516 may allocate the funds of the pot to the winning participant or participants. For example, the pot may be allocated to the winning player or split between the winning player and one or more participating observers (e.g., non-players watching the winning player). In some cases, side bet monitor 516 may allocate a percentage of the pot to the proprietor of the gaming location or gaming service. In other cases, the entire pot of the side bet may be allocated to the winning participants. For example, a side bet in side bets 518 may specify a parameter that the side bet is won when a player receives a full house in a video poker game. Side bet monitor 516 may then monitor game data 508 for that game to determine whether any of the side bet participants received a full house in the game. If so, side bet monitor 516 may then award the pot to the winning participant of the side bet.

Figure 6:
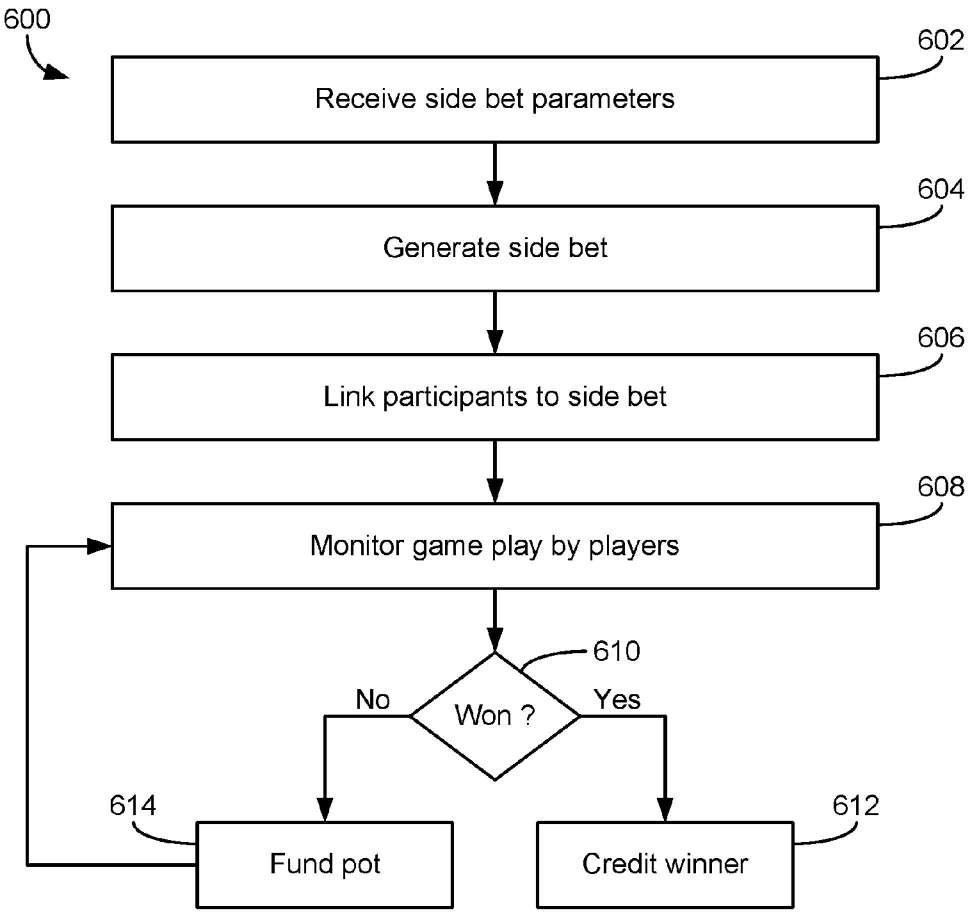
FIG. 6 is a flow diagram of a process for conducting an electronic side bet, according to an exemplary embodiment.

Referring now to FIG. 6, a flow diagram is shown of a process 600 for conducting an electronic side bet, according to an exemplary embodiment. Process 600 may be implemented by one or more processing circuits configured to execute stored machine instructions. For example, process 600 may be implemented by a processing circuit of a gaming machine or another device in communication with a gaming machine. In general, process 600 allows any number of individuals to place bets contingent on one or more events that can occur in different instances of a wager-based game. The side bets may be managed across different gaming machines or other devices operated by the side bet participants (e.g., desktop devices, mobile devices, etc.).

Process 600 includes receiving side bet parameters (step 602). In general, the side bet parameters are data values that control how the side bet operates. Example parameters may include, but are not limited to, parameters that control how many participants are allowed to participate in the side bet, parameters that specify the in-game event or events used to determine whether the side bet has been won, parameters that control how the pot of the side bet is funded (e.g., as a progressive payout based on in-game winnings, etc.), which individuals are allowed to participate in the side bet, whether and how an individual can join the side bet at a later time, or other such parameters. In one embodiment, the side bet parameters are included as part of a side bet template. In various embodiments, the side bet parameters are received via a graphical user interface provided to a gaming machine or another device operated by the individual setting up the side bet (e.g., the individual's mobile device, desktop computer, etc.). Parameters received via such an interface may be received by a remote server configured to administer the side bet.

Process 600 includes generating a side bet based on the received side bet parameters (step 604). During generation, invitation notifications may be sent to eligible participants of the side bet. For example, a player may receive an invitation to join in the side bet while playing an instance of the game associated with the side bet. During generation, one or more triggers may be generated to control how the side bet is administered. For example, one trigger may correspond to the winning in-game event associated with the side bet. In another example, another trigger may correspond to a minimum number of participants required to begin the side bet. In one embodiment, the side bet is generated by an application configured to monitor gameplay data from the gaming machines or other devices.

Process 600 includes linking the participants to the side bet (step 606). Participants may be linked to the side bet, in some cases, in response to accepting an invitation to join the side bet. In other cases, a participant may actively search for, and join, an open side bet. Typically, the side bet participants are players engaged in playing a particular type of wager-based game associated with the side bet. For example, players that are playing instances of the game "Video Poker" may join in a side bet associated with the game. In one embodiment, non-players may also participate in a side bet by wagering on a specific player. For example, a non-player observer watching his or her friend playing "Video Poker" may join in a side bet that the friend will be the first to get a full house. Participants may be linked to the side bet in any number of ways, such as associating a player's account (e.g., loyalty account, social networking account, etc.) with the side bet. In some embodiments, a participant being linked to the side bet may be required to fund the pot of the side bet at this time. For example, one side bet may require participants to each chip in a certain amount when they join the side bet.

Process 600 includes monitoring gameplay by players linked to the side bet (step 608). Gameplay may be monitored, for example, by one or more servers that receive gameplay data from the devices on which instances of the game are played. For example, a gaming machine on which "Video Poker" is being played may send gameplay data to a remote server configured to administer the side bet. Gameplay data may include any data regarding a player's interaction with the wager-based game. For example, gameplay data may include data regarding in-game events (e.g., the results of a round of gameplay, entry into a bonus round, the results of a bonus round, etc.), wagers placed by a player, winnings and/or losses of the player, or the like. In some cases, gameplay data may also include timing information used by the server administering the side bet. For example, a side bet may also include a timing aspect, such as awarding the pot to the first player to get five star symbols in a slot game within ten minutes.

Process 600 includes a decision step at which it is determined whether one or more participants have won the side bet (step 610). In some embodiments, the occurrence of an in-game event specified in the side bet parameters may trigger one or more participants winning the pot of the side bet. For example, the server administering the side bet may determine that a particular player has won the side bet based on the player receiving a full house in an instance of the wager-based game associated with the side bet.

If it is determined that one or more participants have won the side bet in step 610, he or she may be credited the pot of the side bet (step 612). For example, the funds of the pot may be allocated to the account of the winning participant or may be awarded as in-game credits for the participant. If multiple participants have wagered on the same player, the pot may be split among the winning participants. For example, the pot may be split by the winning player (e.g., the player that experienced the in-game event associated with the side bet) and one or more non-player observers that wagered on the player experiencing the in-game event (e.g., observers that wager on the event occurring in a particular instance of the game). In some cases, a portion of the pot may be allocated to the proprietor of the gaming location or gaming service. In other cases, the entire pot may be allocated to the winning player or players.

If it is determined in step 610 that a player has not won the pot, the pot may be funded by continued use of the game (step 614). The triggering event to fund the pot may be a player winning a round of gameplay in an instance of the wager-based game associated with the side bet. For example, a percentage of the player's winnings may be allocated to the pot of the side bet (e.g., the pot is a progressive payout). Other triggering conditions may also be used, such as other specific in-game events. For example, a player may only be required to contribute to the pot if he or she has won a round of gameplay in a video poker game with three of a kind or better. In one embodiment, a player joining the side bet after the side bet has started may be required to fund the pot by paying a buy-in amount. The buy-in amount may be an average of the contributions of the other participants in the side bet, may be a fixed amount, or any other amount. Steps 608, 610, and 614 may be repeated any number of times before step 612 occurs, in some embodiments. In other words, the pot may continue to grow until the side bet is won by one or more of the participants.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

The invention claimed is:

1. A method of operating a gaming system, said method comprising:

receiving, by at least one processor, side bet parameters that control how to conduct a side bet and that include a designated in-game event and a set of one or more designated awards;

generating, by the at least one processor, the side bet using the side bet parameters;

linking, by the at least one processor, the side bet to an account of each of a plurality of side bet participants;

monitoring, by the at least one processor, play of a plurality of instances of one or more games on a plurality of gaming machines by the side bet participants, one or more of the plurality of instances of the one or more games including a random determination and being conducted by one of the side bet participants on one of the plurality of gaming machines following: (1) receipt of a physical item associated with a monetary value by an acceptor of that gaming machine; (2) establishment of a credit balance based at least in part on the monetary value associated with the received physical item; and (3) placement of a wager on that instance of the game responsive to an actuation of a wager button of that gaming machine, wherein the credit balance is decreasable by the wager, increasable based on any awards for that instance of the game, and decreasable via an actuation of a cashout button of that gaming machine to initiate a payout;

funding, by the at least one processor, a side bet pool with a portion of any designated awards the side bet participants win for the plurality of instances of the one or more games;

sending, through a network, a side bet status update to a first mobile device of a first one of the side bet participants;

determining, by the at least one processor, a winning side bet participant responsive to an occurrence of the designated in-game event; and providing at least part of the side bet pool to the winning side bet participant.

2. The method of claim 1, which includes receiving, by the at least one processor, the side bet parameters from a mobile device of one of the side bet participants.

3. The method of claim 1, which includes sending invitations to a plurality of users to participate in the side bet.

4. The method of claim 3, wherein sending the invitations to the plurality of users includes sending, through a network, the invitations to mobile devices of one or more of the plurality of users.

5. The method of claim 3, which includes obtaining, by the at least one processor, a list of the plurality of users.

6. The method of claim 5, wherein obtaining the list of the plurality of users includes retrieving, by the at least one processor, the list from a website.

7. The method of claim 6, wherein a gaming establishment in which the plurality of gaming machines are located does not control the website.

8. The method of claim 1, which includes receiving, by the at least one processor, a user request to join the side bet after the side bet has started, and enabling the user to join the side bet responsive to receipt of a fee.

9. The method of claim 8, which includes funding, by the at least one processor, the side bet pool with at least part of the fee.

10. The method of claim 1, wherein the designated in-game event is associated with multiple plays of a game.

11. A gaming system comprising:

at least one processor; and at least one memory device that stores a plurality of instructions, which when executed by the at least one processor, cause the at least one processor to operate with a plurality of wagering gaming machines to:

generate the side bet using received side bet parameters that include a designated in-game event and a set of one or more designated awards;

link the side bet to an account of each of a plurality of side bet participants;

monitor play of a plurality of instances of one or more games on the plurality of gaming machines by the side bet participants, one or more of the plurality of instances of the one or more games including a random determination and being conducted by one of the side bet participants on one of the plurality of gaming machines following: (1) receipt of a physical item associated with a monetary value by an acceptor of that gaming machine; (2) establishment of a credit balance based at least in part on the monetary value associated with the received physical item; and (3) placement of a wager on that instance of the game responsive to an actuation of a wager button of that gaming machine, wherein the credit balance is decreasable by the wager, increasable based on any awards for that instance of the game, and decreasable via an actuation of a cashout button of that gaming machine to initiate a payout;

fund a side bet pool with a portion of any designated awards the side bet participants win for the plurality of instances of the one or more games;

send a side bet status update to a first mobile device of a first one of the participants;

determine a winning side bet participant responsive to an occurrence of the designated in-game event; and provide at least part of the side bet pool to the winning side bet participant.

12. The gaming system of claim 11, wherein the controller includes a network interface configured to receive the side bet parameters from a mobile device of one of the side bet participants.

13. The gaming system of claim 11, wherein the controller is configured to send invitations to a plurality of users to participate in the side bet.

14. The gaming system of claim 13, wherein the controller is configured to send the invitations to mobile devices of one or more of the plurality of users.

15. The gaming system of claim 13, wherein the controller is configured to obtain a list of the plurality of users.

16. The gaming system of claim 15, wherein the controller is configured to obtain the list of the plurality of users by retrieving the list from a website.

17. The gaming system of claim 16, wherein a gaming establishment in which the plurality of gaming machines are located does not control the website.

18. The gaming system of claim 11, wherein the controller is configured to enable a user to join the side bet after the side bet has started in exchange for a fee.

19. The gaming system of claim 18, wherein the controller is configured to fund the side bet pool with at least part of the fee.

20. The gaming system of claim 11, wherein the designated in-game event is associated with multiple plays of a game.

* * * * *